US010666659B2

(12) United States Patent
Treleaven

(10) Patent No.: US 10,666,659 B2
(45) Date of Patent: May 26, 2020

(54) SYSTEM AND METHOD FOR PROTECTING AGAINST E-MAIL-BASED CYBERATTACKS

(71) Applicant: Bravatek Solutions, Inc., Austin, TX (US)

(72) Inventor: Ian Anthony Treleaven, Maple Ridge (CA)

(73) Assignee: Bravatek Solutions, Inc., Austin, TX (US)

( * ) Notice: Subject to any disclaimer, the term of this patent is extended or adjusted under 35 U.S.C. 154(b) by 0 days.

(21) Appl. No.: 15/246,500

(22) Filed: Aug. 24, 2016

(65) Prior Publication Data

US 2017/0063869 A1    Mar. 2, 2017

Related U.S. Application Data

(60) Provisional application No. 62/209,055, filed on Aug. 24, 2015.

(51) Int. Cl.
*H04L 29/06*    (2006.01)
*H04L 12/58*    (2006.01)

(52) U.S. Cl.
CPC ......... *H04L 63/102* (2013.01); *H04L 51/08* (2013.01); *H04L 51/22* (2013.01); *H04L 63/20* (2013.01)

(58) Field of Classification Search
CPC ....... H04L 51/12; H04L 51/08; H04L 63/102; H04L 51/22; H04L 63/20
See application file for complete search history.

(56) References Cited

U.S. PATENT DOCUMENTS

| | | | |
|---|---|---|---|
| 6,421,709 B1 | 7/2002 | McCormick et al. | |
| 6,621,892 B1 | 9/2003 | Banister et al. | |
| 7,454,467 B2 | 11/2008 | Girouard et al. | |
| 7,730,137 B1* | 6/2010 | Toomey | H04L 51/12 709/206 |
| 7,756,929 B1* | 7/2010 | Pettigrew | H04L 51/12 709/206 |
| 7,925,706 B2 | 4/2011 | Glickstein | |
| 8,843,566 B2 | 9/2014 | Thompson | |
| 9,059,870 B1* | 6/2015 | Sobel | H04L 51/066 |
| 9,118,720 B1* | 8/2015 | Raman | G06F 11/004 |
| 9,686,308 B1* | 6/2017 | Srivastava | H04L 63/1441 |
| 2002/0039419 A1* | 4/2002 | Akimoto | H04N 1/00209 380/243 |
| 2003/0231207 A1* | 12/2003 | Huang | H04L 51/12 715/752 |
| 2004/0064733 A1* | 4/2004 | Gong | G06Q 10/107 726/27 |

(Continued)

FOREIGN PATENT DOCUMENTS

| | | |
|---|---|---|
| CN | 1981494 B | 5/2010 |
| GB | 2443873 A | 5/2008 |

OTHER PUBLICATIONS

Exchange Server 2013, Microsoft [retrieved on Jan. 18, 2017]. Retrieved from the Internet: <URL: https://products.office.com/en-us/exchange/microsoft-exchange-server>.

*Primary Examiner* — Techane Gergiso
(74) *Attorney, Agent, or Firm* — Hojka Qadeer, LLC

(57) ABSTRACT

A system for dynamically managing email access and content is described, wherein the email system based on email rules and filters may modify emails presented to users or limit access to the email content via a specific architecture.

12 Claims, 11 Drawing Sheets

(56) References Cited

U.S. PATENT DOCUMENTS

| | | | |
|---|---|---|---|
| 2005/0204008 A1* | 9/2005 | Shinbrood | H04L 51/08 709/206 |
| 2006/0031357 A1* | 2/2006 | Misra | H04L 51/22 709/206 |
| 2007/0019226 A1* | 1/2007 | Matsuura | G06F 3/1207 358/1.14 |
| 2007/0083602 A1* | 4/2007 | Heggenhougen | H04L 51/063 709/206 |
| 2009/0006975 A1* | 1/2009 | Salim | G06F 17/3089 715/738 |
| 2011/0196931 A1* | 8/2011 | Clagg | H04L 51/12 709/206 |
| 2012/0275596 A1* | 11/2012 | Ureche | H04L 9/002 380/47 |
| 2013/0061307 A1* | 3/2013 | Livne | H04W 12/06 726/7 |
| 2013/0205198 A1* | 8/2013 | Cohen | H04L 51/34 715/240 |
| 2013/0232205 A1* | 9/2013 | Gorecha | G06Q 10/10 709/206 |
| 2015/0019654 A1* | 1/2015 | Wheeler | H04L 51/24 709/206 |
| 2015/0032829 A1 | 1/2015 | Barshow et al. | |
| 2015/0113606 A1* | 4/2015 | Dabbiere | H04L 63/0281 726/4 |
| 2015/0150098 A1* | 5/2015 | Murphy | H04L 63/20 726/4 |
| 2015/0156346 A1* | 6/2015 | Park | G06Q 10/107 358/402 |
| 2015/0200894 A1* | 7/2015 | Gough | G06Q 30/0273 715/752 |
| 2015/0212889 A1* | 7/2015 | Amarendran | G06F 11/1402 707/674 |
| 2015/0271117 A1* | 9/2015 | Massand | H04L 51/08 715/752 |
| 2015/0295866 A1* | 10/2015 | Collet | G06Q 10/107 709/206 |
| 2015/0324602 A1* | 11/2015 | Lim | G06F 17/3089 726/1 |
| 2015/0373106 A1* | 12/2015 | Dennis | H04L 51/22 709/219 |
| 2016/0112356 A1* | 4/2016 | Zheng | H04L 51/066 709/206 |
| 2016/0182417 A1* | 6/2016 | Cordes | H04L 51/08 709/206 |
| 2016/0308812 A1* | 10/2016 | Johnstone | H04L 51/22 |
| 2016/0328097 A1* | 11/2016 | Ganin | G06F 3/0482 |

\* cited by examiner

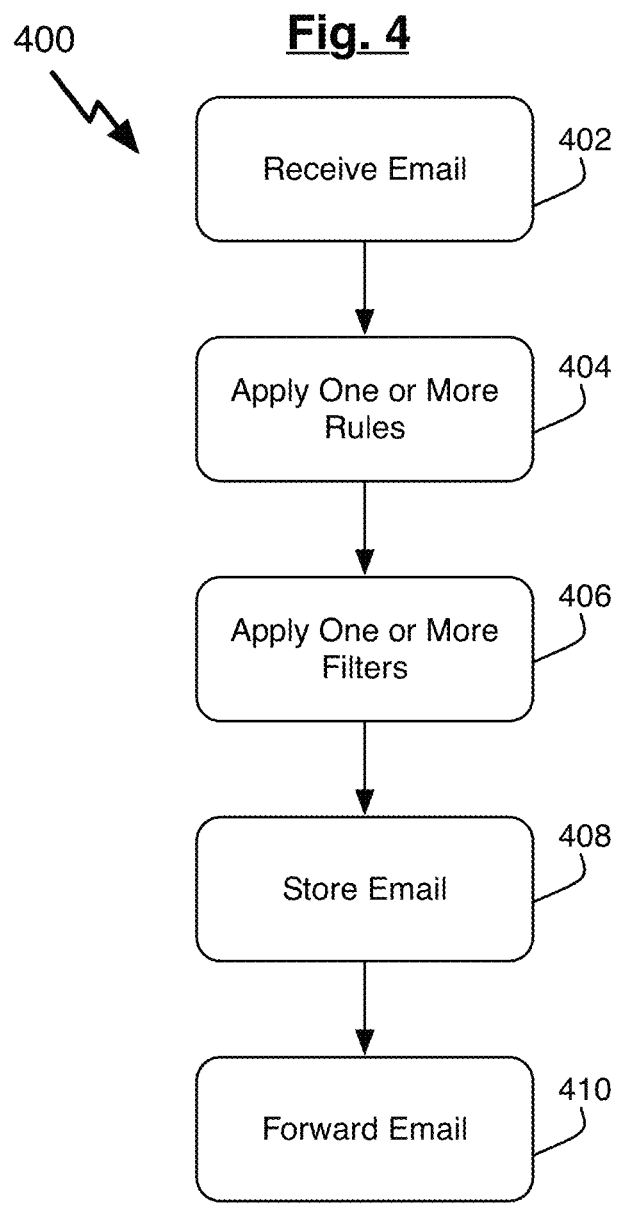

Figure 5

External Users - Add

Email/Domain: @AOL.com

Description: AOL Users okay but no attachments allowed

Portal User Status: None

| | |
|---|---|
| Can send emails | ⦿ Enable ○ Disable ○ Inherit ○ Must Use Portal |
| Can receive emails | ⦿ Enable ○ Disable ○ Inherit ○ Must Use Portal |
| Can send attachments | ○ Enable ⦿ Disable ○ Inherit |
| Can receive attachments | ○ Enable ⦿ Disable ○ Inherit |
| Convert sent attachments to PDF | ○ Enable ○ Disable ⦿ Inherit |
| Convert received attachments to PDF | ○ Enable ○ Disable ⦿ Inherit |
| Convert sent message body to plain text | ⦿ Enable ○ Disable ○ Inherit |
| Prevent screen capture of received mail | ○ Enable ○ Disable ⦿ Inherit |

Block Sent File Extensions: Inherit

Block received File Extensions: Inherit

[Cancel] [Save Changes]

Figure 7

*Email Security Rules*

| Description | Type | Address/Group Name | For | Priority | Enabled | Actions |
|---|---|---|---|---|---|---|
| Check for Sensitive Messages | Group | Executive | Sent emails | 20 | Yes | Edit | Delete |
| Global Blacklist Rule (For Incoming Mail) | Global | | Received emails | 1 | Yes | Edit | Delete |
| Global Blacklist Rule (For Outgoing Mail) | Global | | Sent emails | 1 | Yes | Edit | Delete |
| Rule for external address @xcryptinc.com (for received mail) | Global | | Sent emails | 60 | Yes | Edit | Delete |
| Rule for external address @xcryptinc.com (for sent mail) | Global | | Received emails | 60 | Yes | Edit | Delete |
| Whitelisting compusult.net | Global | | Sent and received emails | 50 | Yes | Edit | Delete |
| Whitelisting Email | Global | | Sent and received emails | 50 | Yes | Edit | Delete |

Showing 1 to 7 of 7 entries

*Email Security Rules - Add*

Description
[ Accounting Spreadsheets Internal Only| ] ✕

Type　　　　　　　　　　Group　　　　　　　　　　Priority
[ Group ▾ ]　　　　　　　[ Accounting ]　　　　　　　[ 50 ▾ ]

☑ Enable　　　　　　　☑ For sent emails　　　　　○ For received emails

Conditions　　　　　　　　　　　　　　　　Match all of these ● Match any of these ○
[ Attachment ▾ ] [ Has file extension ▾ ] [ xls ]　[+][-]
[ Attachment ▾ ] [ Has file extension ▾ ] [ xlsx ]　[+][-]

Actions
[ Set email permission ▾ ] [ Internal or portal users only ▾ ] [+][-]

[ Cancel ]　[ Save Changes ]

SYSTEM AND METHOD FOR PROTECTING AGAINST E-MAIL-BASED CYBERATTACKS

CROSS-REFERENCE TO RELATED APPLICATIONS

This application claims the benefit of, and priority to, U.S. provisional patent application Ser. No. 62/209,055 filed Aug. 24, 2015 and the aforementioned application is hereby incorporated herein by reference.

FIELD OF THE INVENTION

The present disclosure is related to effective, efficient, and economical methods and systems for improvements in the processing of email, particularly in respect to controlling access to emails and modifying said emails to meet security conditions.

BACKGROUND OF THE INVENTION

While the Internet has popularized email as a modern form of communication, email systems were largely designed using an unsecure store-and-forward architecture. Accordingly, emails can often by read by any person who has access to network traffic, intermediary servers, email storage, etc. Various methods have been proposed to resolve the unsecure nature of email communication, such as encryption of emails or network connections. However, these solutions only prevent access to emails at various points in the storage or transit of emails. Further improvements are required to provide secure and controlled access to emails at all times and locations.

SUMMARY

An example of a system for securely managing email access and content is described. The system may be comprised of an email database for storing emails and email attachments; a user database; and an email server, wherein the content of the email is restricted or modified according to a set of rules profiles. In some embodiments, the set of rules profiles includes instructions for converting email attachments to a different form of media. In some embodiments, each rules profile is applied based on a user's email address or domain. In some embodiments, the set of rules profiles further includes instructions that the email or email attachments may only be accessed via a webmail server. In some embodiments, a subset of the rules profiles is applied based on a user's assigned grouping.

BRIEF DESCRIPTION OF THE DRAWINGS

FIG. 4 illustrates an example of a method for handling emails that are received by the enhanced email system.

FIG. 5 illustrates an example of a rules profile that may be used with the enhanced email system.

FIG. 7 illustrates an example of a list of rules profiles.

FIG. 10 illustrates an example of a rules profile further containing email filters.

FIG. 11 illustrates another example of a rules profile further containing email filters.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
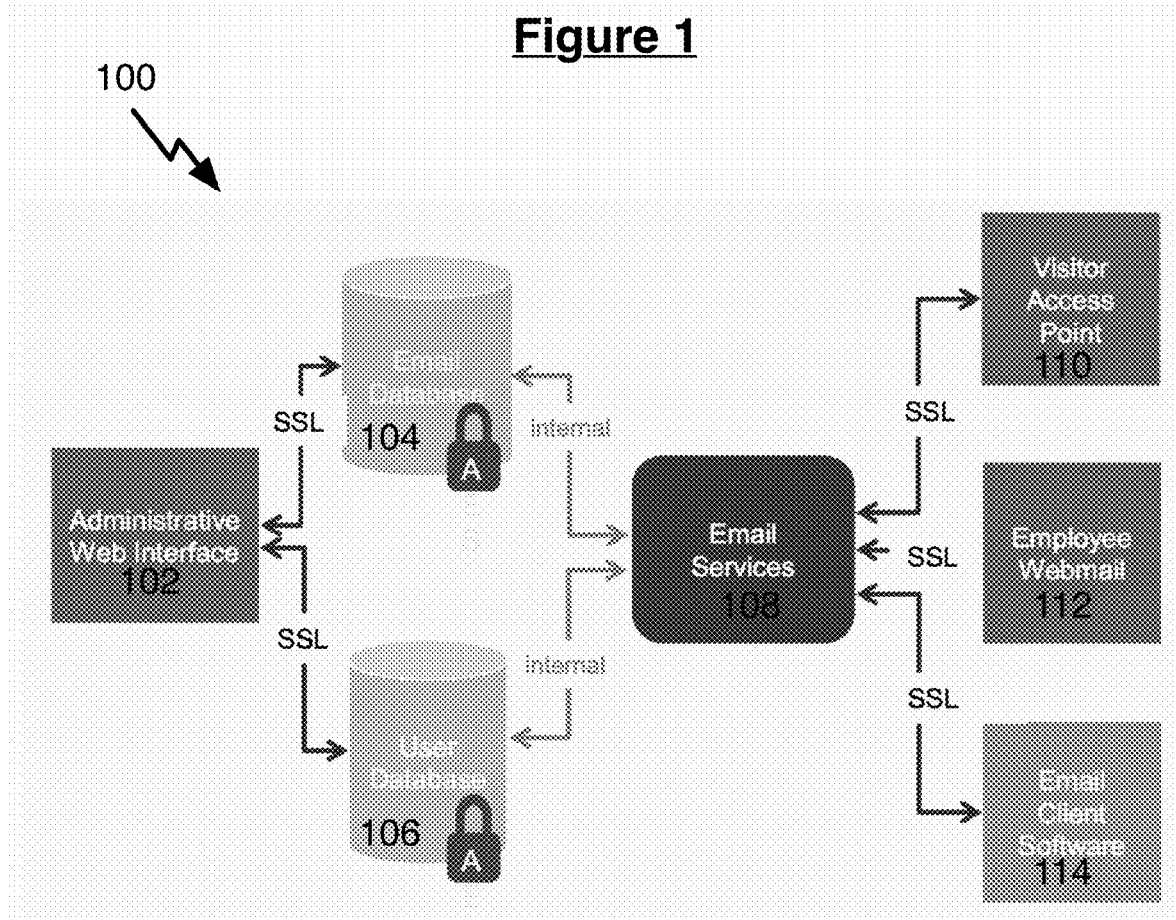
FIG. 1 illustrates an example of a system for implementing an enhanced email system.

With respect to FIG. 1, an example of a system for implementing an enhanced email system 100 is shown. Administrative Web Interface 102 may be used to configure the elements of system 100, including Administrative Web Interface 102. Email Database 104 may be used to maintain a database of emails and related documents. User Database 106 may be used to maintain a database of user records and may also maintain their associations with respect to the emails located in Email Database 104. Email Services 108 may perform in the role of an email server as known in the art and may further perform the methods described herein. Visitor Access Point 110 may be a webmail server or other email interface for use with outside users, such as non-employees. Employee Webmail 112 may be a webmail server or other email interface for use with internal users, such as employees. Email Client Software 114 may be email software, such as Microsoft Outlook, Apple Mail, etc.

In some embodiments, System 100 may only be composed of a subset of the above elements. For example, an embodiment of System 100 may only be composed of Email Database 104, User Database 106, and Email Services 108. System 100 may be implemented using any variety of computer-based technologies, such as computers, servers, cloud-based computing, etc. For example, Email Database 104, User Database 106, and Email Services 108 may reside on one or more servers located within a network that then communicate, such as through secure connections (e.g., Secure Sockets Layer), to other computers that implement Administrative Web Interface 102, Visitor Access Point 110, Employee Webmail 112, Email Client Software 114, etc.

Figure 2:
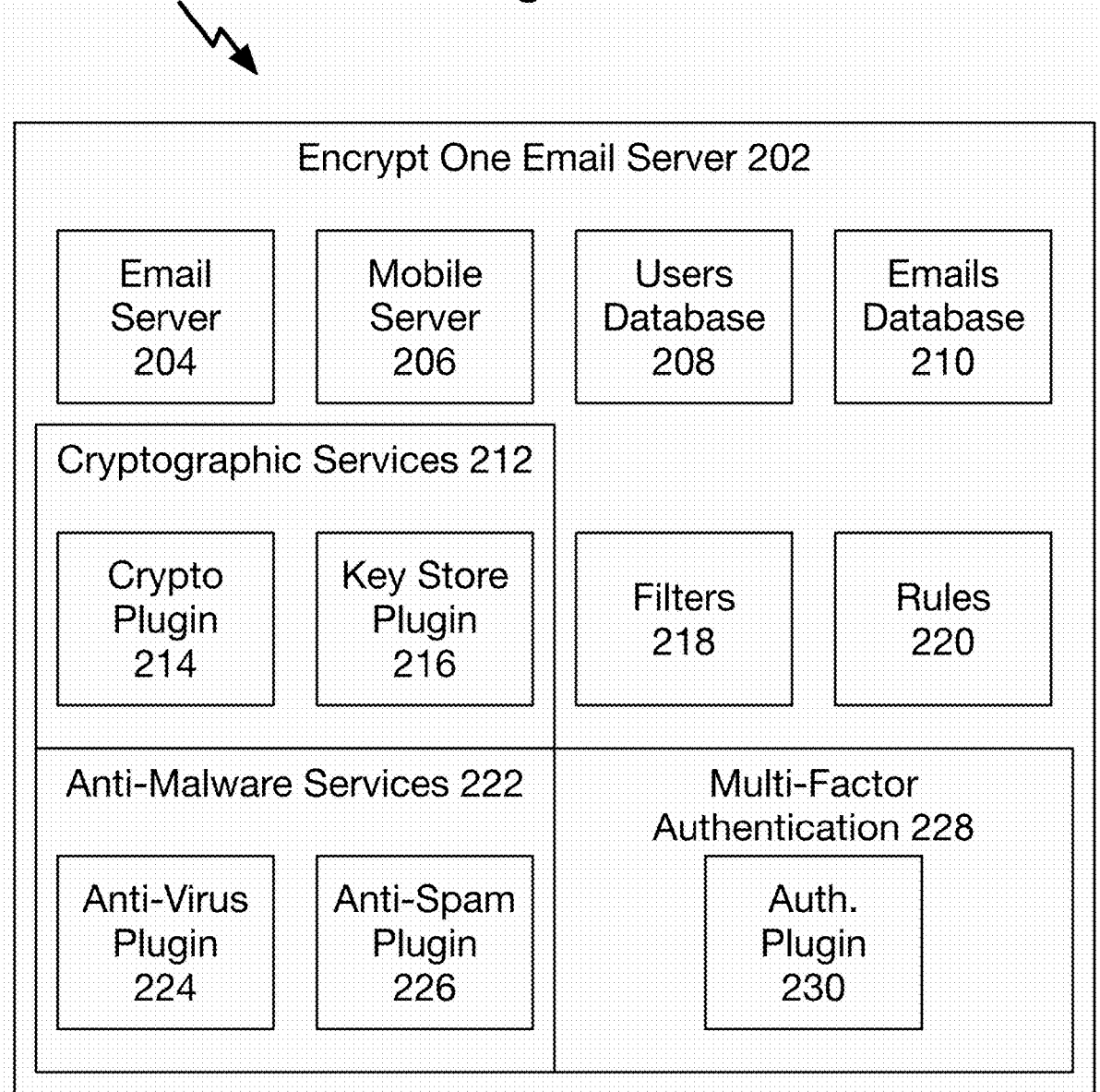
FIG. 2 illustrates another example of a system for implementing an enhanced email system.

With respect to FIG. 2, another example of a system for implementing an enhanced email system 200 is shown. Email Server 202 may be composed of an Email Server 204 (e.g., Internet Message Access Protocol server), a Mobile Server 206 that may perform the synchronization of email, contacts, calendar, tasks, and notes from a messaging server to a smartphone or other mobile devices (e.g., a Microsoft ActivSync Server), a Users Database 208 for maintaining user accounts, and an Emails Database 210 for maintaining email documents.

System 200 may also contain a Cryptographic Services Component 212, which may provide cryptographic services relating to the methods described herein. Cryptographic Services Component 212 may also support plugins, such as Crypto Plugin 214 that allows for different forms of encryption to be supported by Cryptographic Services Component 212, such as public key-encryption (e.g., RSA) or private-key encryption. Cryptographic Services Component 212 may also support a Key Store Plugin 216 for secure management of cryptographic keys.

System 200 may also contain a Filters Component 218 that may contain email filters as described herein and may be used by System 200 to filter emails handled by System 200. System 200 may also contain a Rules Component 220 that may contain email rules as described herein and may be used by System 200 to process emails handled by System 200.

System 200 may also contain an Anti-Malware Services Component 222 for managing malicious emails (e.g., emails containing spam, viruses, malware, etc.). Anti-Malware Services Component 222 may also support plugins, such as Anti-Virus Plugin 224 that may allow for different forms of anti-virus protection to be supported by Anti-Malware Services Component 222. Anti-Malware Services Component 222 may also support an Anti-Spam Plugin 226 that may allow for different forms of anti-virus protection to be supported by Anti-Malware Services Component 222. System 200 may also contain a Multi-Factor Authentication Component 228 for further managing access to System 200 based on two or more authentication requirements (e.g., a user password and a RSA SecurID Token). Multi-Factor Authentication Component 228 may also contain plug-ins to extend its functionality, such as an Authentication Plug-in 230.

Figure 3:
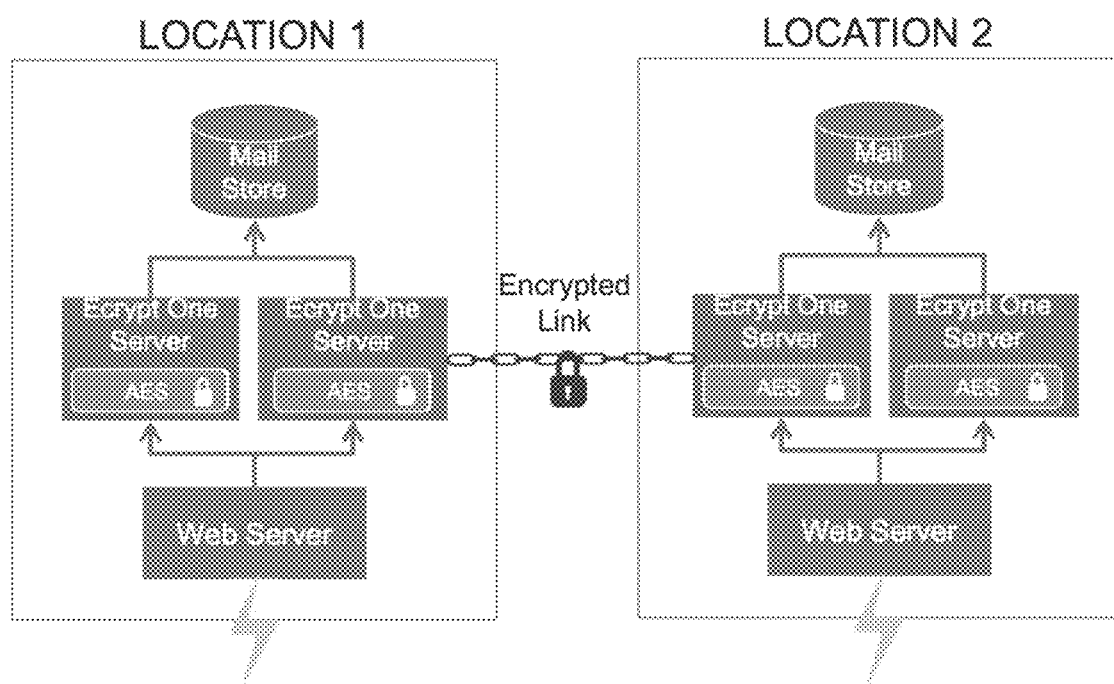
FIG. 3 illustrates an example of how multiple instances of an enhanced email system may be implemented.

With respect to FIG. 3, an example is shown of how multiple instances of System 100 or System 200 may be implemented. For example, Location 1 may contain two instances of System 200 to provide redundant or quicker services to users accessing Location 1. In addition, Location 2 may contain two instances of System 200 to provide redundant or quicker services to users accessing Location 2. Further, Location 1 and Location 2 may be connected via an encrypted link over a network or private line, thereby allowing for any necessary synchronization to maintain redundant or quicker services between the various instances of System 200. For example, the instances may exchange email records, user records, email filters, email rules, etc. to improve redundancy or provide quicker service to users of any instance of System 200.

With respect to FIG. 4, an example of a method 400 is shown for handling emails that are received by the enhanced email system. At step 402, the system may receive an email, which may contain attachments, data, metadata, etc. At step 404, the system may apply one or more rules to determine how emails should be processed, which may include modifying the email, metadata, or data attached to the email. In some embodiments, the system may have a global set of rules that apply to all email or group rules that only apply to an email based on selected criteria (e.g., domain name, specific sender or receiver email address, user groupings, keywords). At step 406, the system may apply one or more filters to determine how emails should be processed, which may also include modifying the email, metadata, or data attached to the email. Further examples of email rules and email filters that may be used to within steps 404 and 406 are described below.

At step 408, the system may store the email. In some embodiments, the system may store only the modified email after processing a received email according to steps 404 or 406. In other embodiments, the system may store the email as it was received, but then perform step 404, step 406, or both to modify the mail when asked to retrieve or forward an email in step 410. In such an embodiment, retaining the original email may allow users to not have emails resent after email filters or rules are adjusted. For example, a user may request that an email rule be changed. After changing the rule, the user may then be able to sync their email client, thereby receiving the original emails in place of the previously modified emails it received from the system. In some embodiments, the system may also store both original and modified emails, such as when it is desired to minimize processing burden over the issue of storage requirements. At step 410, the system may forward an email to a recipient or recipients.

With respect to FIG. 5, an example is shown of a rules profile that may be used with the enhanced email system. A rules profile may be created for any characteristic of an email, such as a specific email address, a subset of that email address (e.g., a domain name), specific types of email content, etc. In some embodiments, rules profiles may also have parent/child relationships. For example, a rules profile for a domain name (e.g., aol.com) may act as a parent rules profile for any rules profile of a specific user whose email address contains such a domain name (e.g., bob@aol.com).

As shown in FIG. 5, a rules profile is shown for a specific domain (e.g., aol.com). As part of the rules profile, an informative description may be entered summarizing the rules profile. Such a rules profile may than set rules specific to the characteristic of the email (e.g., domain name) that is associated with the rules profile. For example, as shown in FIG. 5, rules may be set with respect to whether emails from a domain can send emails, can receive emails, or can send attachments. In addition, rules may be selected that convert sent attachments to another form (e.g., PDF, JPG), convert received attachments to another form, convert sent message body to a specific text format (e.g., plain text, text that complies pre-determined font settings), or that disallow screen capture of received mail (e.g., when a user is accessing the system via a webmail interface or email client that provides such an ability). In addition, rules may also be set to block sent or received file extensions.

Depending on the rule, the system may provide different choices on how the rule should applied. For example, if the rule is Enabled than the rule may always be applied; if the rule is Disabled than it may never be applied; if the rule is Inherit, than the relevant setting from a parent rules profile is inherited into that profile (e.g., if a rules profile for bob@aol.com for "can send emails" is set to Inherent and its aol.com parent rules profile is set to Disable on that function, than the rules profile for bob@aol.com will use Disable for "can send emails").

As another example of rules profiles, users may be assigned to various groupings (e.g., sales, HR, engineering, shipping). These groupings may then be stored in the user records and also may be used to create rules profiles based on such groupings. For example, rather than using a domain name-based rules profile as parent profile, a specific email address rules profile may have a sales group parent profile. Such an approach may be used with respect to the system where it is desirable to prohibit certain groups of individuals from sending emails of certain types (e.g., users may be temporarily assigned to an delinquent grouping who are prohibited by that parent rules profile from sending attachments due to misuse of the email system).

Figure 6:
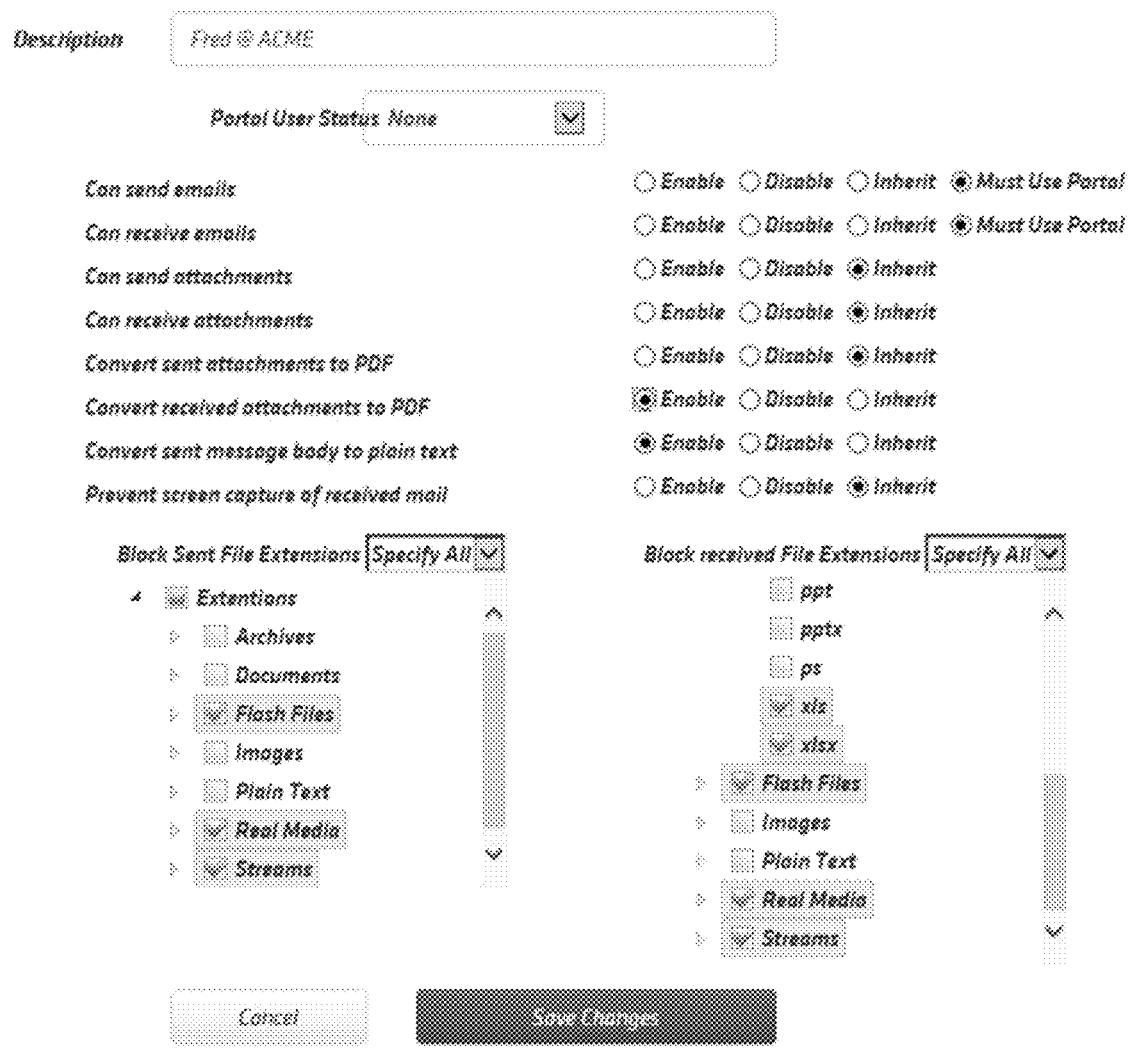
FIG. 6 illustrates further examples of additional rules that may be contained in a rules profile.

With respect to FIG. 6, further examples of additional rules that may be contained in a rules profile are shown. As shown in FIG. 6, Fred@ACME may be a rules profile created for a specific user who is part of an ACME grouping. As shown in FIG. 6, the rules profile may allow for selection of particular data that are blocked in the sending or receiving of an email by Fred@ACME. For instance, the rules profile may allow for a user to not receive or send emails that contain archives, documents, flash files, images, plain text, real media, streams, ppt, pptx, ps, xls, xlsx, flash files, etc. Such selections may be based on data type, file extensions, metadata identifiers, etc.

With respect to FIG. 7, an example of a list of rules profiles is shown. Each rules profile in the list may be presented with a description, type, Address/Group Name, affected emails (e.g., "For"), Priority (e.g., to determine which rules take precedence), whether such a rule is enabled, and selectable actions with respect to each rule (e.g., edit, delete).

In some embodiments, the rules may specific constraints normally not allowed by an email system. For example, it may be desired that external users must use a webmail interface (e.g., visitor access point) for interacting with email in certain circumstances. For example, if an email contains attachments, the rules profile relating to that email may specify that recipient must use a webmail interface to view that attachment. In such embodiments, recipient(s) may only access such an email from a webmail interface when rules profile requires that as a condition to access the email. In further embodiments, the system may send an email to the recipient(s) indicating that an email is available via a web interface.

Figure 8:
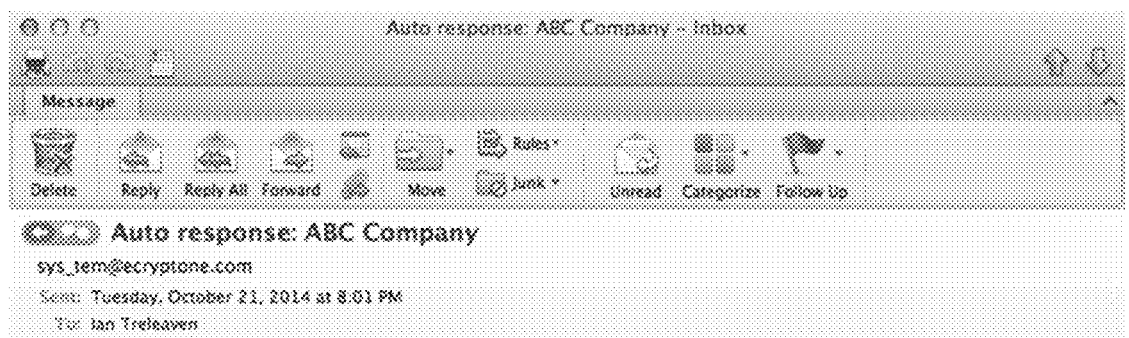
FIG. 8 illustrates an example of a request to use a visitor access point.
Figure 9:
FIG. 9 illustrates an example of registration request.

If a recipient has not previously used such a webmail interface, the system may provide them with an email informing them of how they can create account to use with the webmail interface as shown in FIG. 8. A recipient may then request a webmail account (e.g., portal account) as shown in FIG. 9. In accordance with these embodiments, access to a company's email system may be restricted such that external users can access only emails sent to them via the company's webmail server (which may impose various restrictions, such as a prohibition on forwarding, screen captures, etc.), as opposed to external email servers where the company has no ability to control the handling of emails.

Figure 10:
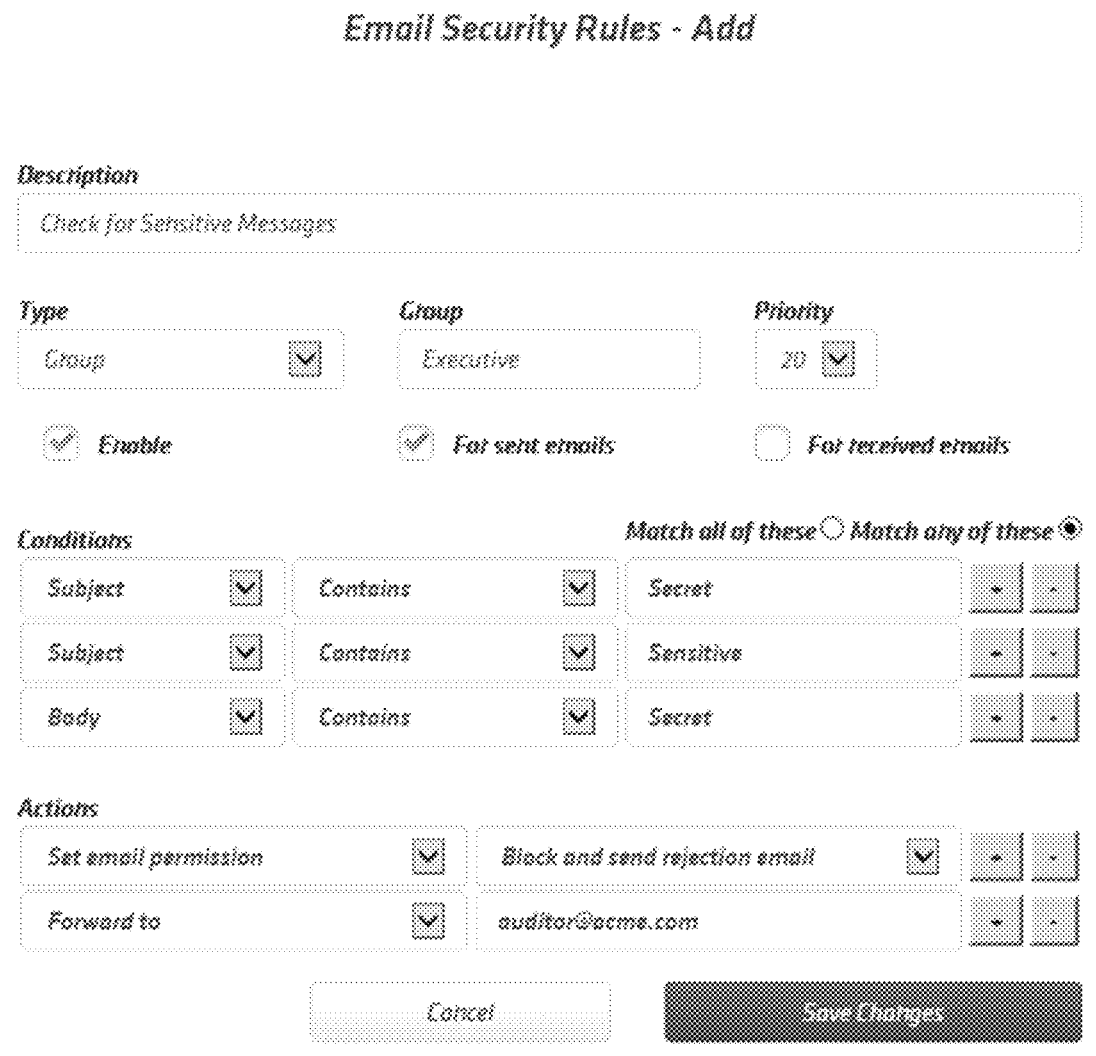

With respect to FIG. 10, an example is shown of a rules profile further containing email filters. For example, conditions may set to determine if an email satisfies a filter, such as if the subject, body, recipient, etc. contains certain keywords. If a filter determines that an email meets a condition, than a rules profile may specify actions to be taken with such an email, such as rejecting the email, sending a reply notice informing the sender of the rejection, and forwarding it to another user for review. Another example of a rules profile further containing email filters is shown in FIG. 11. Rules profiles may use any email filter conditions known in the art and may also use actions for emails that satisfy such conditions that are known in the art or as described herein.

Based on the rules profiles, the system and methods described herein can disable Internet-based email for some all or users, while allowing access for external users via a webmail server controlled by the system (e.g., visitor access point). It may also apply white-listing or black-listing of emails based on certain conditions as described above.

The system described above may also provide others features. The system may provide persistent email and database encryption. Two-Factor Authentication may be required by the system, such as when an external user accesses a visitor access point. The system may support mobile syncing (e.g., Exchange ActiveSync) over SSL only. The system may support IMAP over SSL only. The system may entirely disable access via POP. The system may allow web access over SSL only. The system may disable direct server access to certain users or networks. The system may provide malware protection.

In some embodiments, the system may provide further protection of encryption keys. Rather than always storing such encryption keys in memory, the system may store such encryption keys in an encrypted drive and associate a special identifier with the encrypted drive. When the encryption key is not needed, the system may unmount the encrypted drive, thereby preventing access to the encryption keys by a malicious user. When access to an encryption key is desired, the system upon receiving the special identifier may temporarily mount the encrypted drive and retrieve the requested encryption keys. In such embodiment, a malicious user will likely not be able to locate any encryption keys when they are not required, as the encrypted drive will not be present on the system. Further, when the encrypted drive is present, a malicious user will likely not be able to retrieve any encryption keys, if the malicious user does not have access to the special identifier. In such embodiments, the special identifier may be changed or otherwise modified (e.g., moved to a different memory location) with each storage or retrieval of an encryption key, thereby making to difficult to determine the form of the special identifier.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for securely managing email access and content comprising:
   one or more memory devices; and
   one or more processors configured to provide:
      an email database for storing emails and email attachments;
      a user database;
      a rules profile database containing a first set of rules profiles, wherein each rules profile is individually associated with an entity, and a second set of rules profiles, wherein each rules profile is associated with a group of entities;
      a web server capable of providing a webmail client; and
      an email server capable of receiving or retrieving an email and any associated email attachments, identifying a first subset of rules profiles from the first set of rules profiles based on one or more entities detected in the email or the email attachments, identifying a second subset of rules profiles from the second set of rules profiles based on the one or more groups of entities associated with the one or more entities, modifying the email and the email attachments according to the first subset of rules profiles or the second subset of rules profiles, determining if based on the first or second subset of rules profiles whether the email requires restricted access, forwarding the email to one or more recipients of the email if restricted access is not required, and if restricted access is required sending a notification email to the one or more recipients that the email must be accessed by the webmail client and only providing access to the email by the one or more recipients via the webmail client.

2. The system of claim 1, wherein the first and second set of rules profiles is capable of including instructions for converting email attachments to a different form of media.

3. The system of claim 2, wherein each group of entities associated with each rule profile of the second set of rules profiles is based on a domain name or a set of email addresses.

4. The system of claim 3, wherein the email system does not maintain encryption keys in memory or other mounted storage media when such encryption keys are not required.

5. The system of claim 1, wherein the webmail client is further capable of restricting the recipients from obtaining screen captures.

6. The system of claim 1, wherein the email server is further capable of determining if the second subset of rules profiles contains priority instructions that override any contrary instructions in the first subset of rules profiles.

7. A computer-implemented method for securely managing email access and content comprising:

storing emails and email attachments;

providing access to a user database;

providing a rules profile database containing a first set of rules profiles, wherein each rules profile is individually associated with an entity, and a second set of rules profiles, wherein each rules profile is associated with a group of entities;

providing a webmail client via a webmail server;

receiving or retrieving an email and any associated email attachments;

identifying a first subset of rules profiles from the first set of rules profiles based on one or more entities detected in the email or the email attachments;

identifying a second subset of rules profiles from the second set of rules profiles based on the one or more groups of entities associated with the one or more entities;

modifying the email and the email attachments according to the first subset of rules profiles or the second subset of rules profiles;

determining if based on the first or second subset of rules profiles whether the email requires restricted access;

forwarding the email to one or more recipients of the email if restricted access is not required; and if restricted access is required sending a notification email to the one or more recipients that the email must be accessed by the webmail client and only providing access to the email by the one or more recipients via the webmail client.

8. The computer-implemented method of claim 7, wherein the first and second set of rules profiles is capable of including instructions for converting email attachments to a different form of media.

9. The computer-implemented method of claim 8, wherein each group of entities associated with each rule profile of the second set of rules profiles is based on a domain name or a set of email addresses.

10. The computer-implemented method of claim 9, further comprising the step of not maintaining encryption keys in memory or other mounted storage media when such encryption keys are not required.

11. The computer-implemented method of claim 7, further comprising the step of restricting the recipients from obtaining screen captures.

12. The computer-implemented method of claim 7, further comprising the step of determining if the second subset of rules profiles contains priority instructions that override any contrary instructions in the first subset of rules profiles.

* * * * *